United States Patent [19]
Ballou

[11] 3,730,572
[45] May 1, 1973

[54] SHORING STRUCTURE

[76] Inventor: Clayton R. Ballou, 136 Baltrusal Place, San Ramon, Calif.

[22] Filed: May 20, 1971

[21] Appl. No.: 145,980

Related U.S. Application Data

[62] Division of Ser. No. 846,759, Aug. 1, 1969, Pat. No. 3,676,972.

[52] U.S. Cl. .................................................. 287/53.5
[51] Int. Cl. ................................................. E04g 7/22
[58] Field of Search ..................................... 287/53.5

[56] References Cited

UNITED STATES PATENTS 3,174,779   3/1965   Moritz ............................ 287/53.5
2,635,717   4/1953   Albrecht et al. ................. 287/53.5

*Primary Examiner*—Andrew V. Kundrat
*Attorney*—Mellin, Hursh, Moore & Weissenberger

[57] ABSTRACT

Disclosed herein are shoring structures having bases and telescoping members, each shoring structure being fabricated of square tubing. In one embodiment of the structure, square tubing of the telescoping member telescopes inside and along square tubing of the base. In a second embodiment, square tubing of the telescoping member telescopes outside and along square tubing of the base member. In yet another embodiment both inner and outer square tubing of the telescoping member telescopes along square tubing of the base.

Lock means are associated with the bases and telescoping members to lock thereto cross bracing between base members, telescoping members, etc. Such lock means include a slidable member which is slidable to a position holding the end portion of a cross brace, and to a position freeing the end portion of the cross brace.

3 Claims, 21 Drawing Figures

FIG_1

FIG_2

FIG_3

FIG_4

FIG_9

FIG_12

FIG_13

FIG_14

FIG_10  FIG_11

FIG_19

FIG_18

FIG_20

FIG_21

SHORING STRUCTURE

CROSS REFERENCE TO RELATED APPLICATION

This application is a division of patent application Ser. No. 846,759, filed Aug. 1, 1969 and now U.S. Pat. No. 3,676,972.

BACKGROUND OF THE INVENTION

This invention relates to shoring structures and, more particularly, to such a shoring structure which utilizes a telescoping member which may be set at a variety of heights.

In the shoring of, for example, overpass roads which are being built, it is well known to provide a series of shoring structures, each having a lower base, and a telescoping upper frame member which may be set at one of a variety of heights, depending on the height of the load to be shored. Generally, the common shoring structure is fabricated of tubing of round cross-section, and the upper frame member has a pair of parallel tubular legs which are slidably positioned within a pair of parallel tubular legs which comprise part of the base. Means are included to selectively set the telescoping member at its proper height.

Because of the uses of such shoring structures, it is, of course, extremely important that it be quite strong, and so improvements in this direction are constantly being sought. An especially critical area is the telescoping member itself, and its interconnection with the base member. While the structure overall should be extremely strong, it should be designed so that telescoping can be easily and conveniently achieved. Above and beyond this, each overall shoring structure should be as simple and easy to use as possible.

As stated previously, a series of shoring structures of the type described are often used. In such circumstance, brace members interconnect the shoring structures, so that the overall resulting structure is strong and stable. The ends of these brace members should be properly fixed to the shoring structures by convenient means to provide proper bracing, but should be easily and conveniently removable therefrom so that the shoring may be taken down quickly and easily when no longer needed.

Finally, when it is necessary for the shoring structure to be built up to a relatively great height, means should be provided to allow bases to be stacked one on top of the other in a safe, strong and convenient manner. On top of these may then be placed a telescoping member, to provide the close adjustment in height previously described.

It is therefore an object of this invention to provide a shoring structure which (i) includes a telescoping member which can be easily and conveniently adjusted, and (ii) is of such overall design as to have extremely great load-bearing qualities.

It is a further object of this invention to provide means for securing interconnecting brace members to a pair of shoring structures by means which securely hold the brace members when required, yet can easily be manipulated to allow the brace members to be easily and conveniently removed.

It is a still further object of this invention to provide means which allow bases to be stacked one on top of the other in a safe, strong and convenient manner.

SUMMARY OF THE INVENTION

Broadly stated, the inventive shoring structure comprises a base having a pair of generally parallel, tubular legs of square cross section, with cross bracing of square cross sections and a telescopic frame member having a pair of generally parallel, tubular legs of square cross-section slidable along the legs of the base, either inside or outside thereof, so that the telescopic frame member is slidable inwardly and outwardly of the base. Each leg of the telescopic frame member has a plurality of spaced apertures therethrough. Further included are first and second pins, the first pin being positionable in any one of the apertures in one leg of the frame member, the second pin being positionable in the corresponding aperture of the other leg of the frame member. Means are associated with the legs of the base to limit the inward sliding of the frame member relative to the base by blocking the pins positioned in their respective apertures.

This invention further comprises a lock for securing the end portion of a longitudinal cross member relative to a frame portion. Such lock comprises a support member fixed to the frame portion, and a shaft fixed to and extending from the support member, the end portion of the longitudinal member being positionable so that the shaft is disposed through an aperture through said end portion of the longitudinal member. A slidable member is associated with the support member and slidable relative thereto. An arm is fixed to and extends from the slidable member, the slidable member being slidable to a first position where the end of the arm is removed from the shaft to freely allow the end portion of the longitudinal member to be positioned so that the shaft is disposed through the aperture, and to freely allow removal of the portion of the longitudinal member from such position, the slidable member being slidable to a second position where the end of the arm is adjacent the shaft, so that the movement of the portion of the longitudinal members from said position with the shaft disposed through the aperture is limited by the arm.

This invention further comprises a frame structure, comprising a first longitudinal upright tube of generally square cross section, and a second longitudinal upright tube of generally square cross section above the first tube and aligned therewith, and having its lower end positioned adjacent the upper end of the first tube. A rigid connecting bar defines an upper portion disposed in the lower end of the second tube, a lower portion of the connecting bar disposed in the upper end of the first tube, and a circumferential lip thereabout intermediate the upper and lower portions of said connecting bar, which rests on the upper end of the first tube, and on which rests the lower end of the second tube.

BRIEF DESCRIPTION OF THE DRAWINGS

These and other objects of the invention will become apparent from a study of the following specification and drawings, in which.

DESCRIPTION OF THE PREFERRED EMBODIMENT

Figure 1:
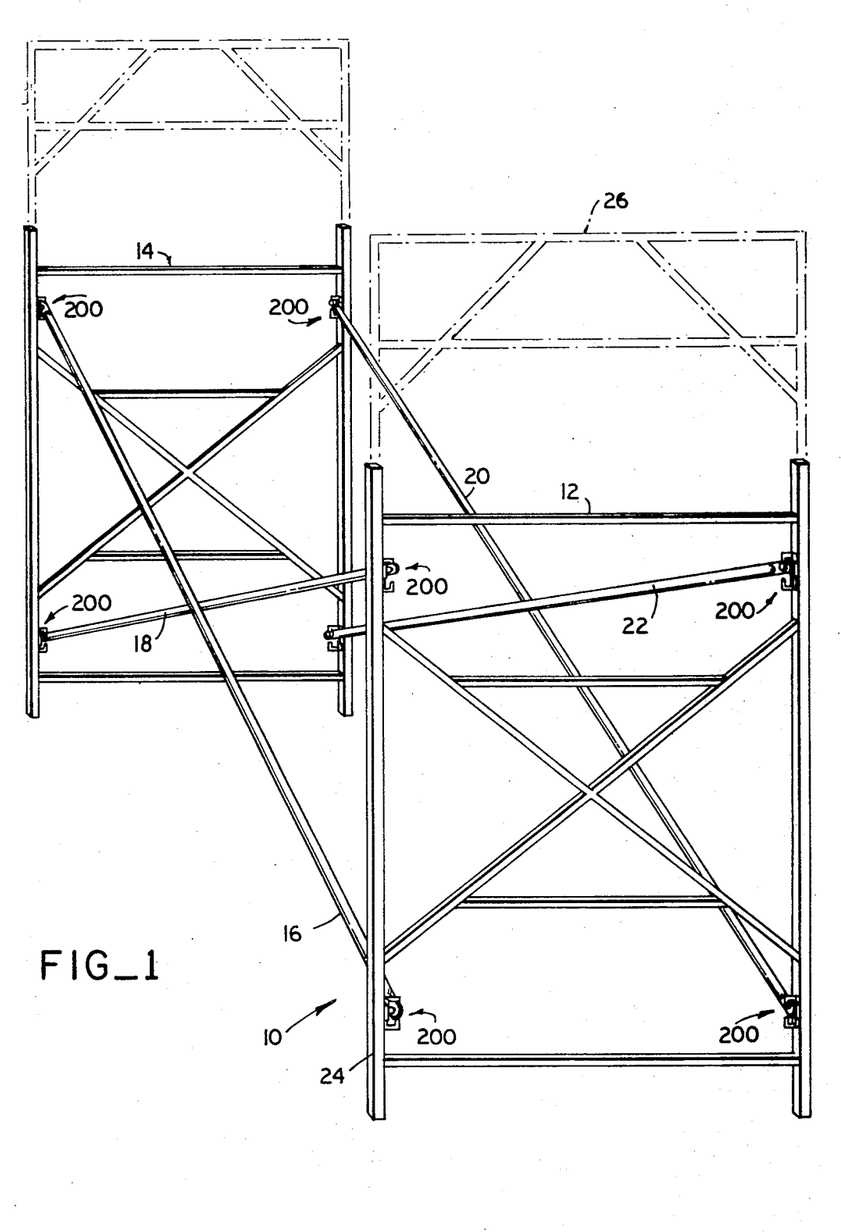
FIG. 1 is an overall perspective view of a pair of base shoring structures interconnected by brace members in accordance with the invention.

Shown generally in FIG. 1 is a shoring system 10 made up of a pair of shoring structures 12, 14 interconnected by longitudinal cross brace members 16, 18, 20, 22. Each shoring structure, such as shoring structure 12, is made up of a base 24, and a telescoping frame member 26. Such a shoring structure 12 is shown in detail in FIGS. 2–4.

Figure 2:
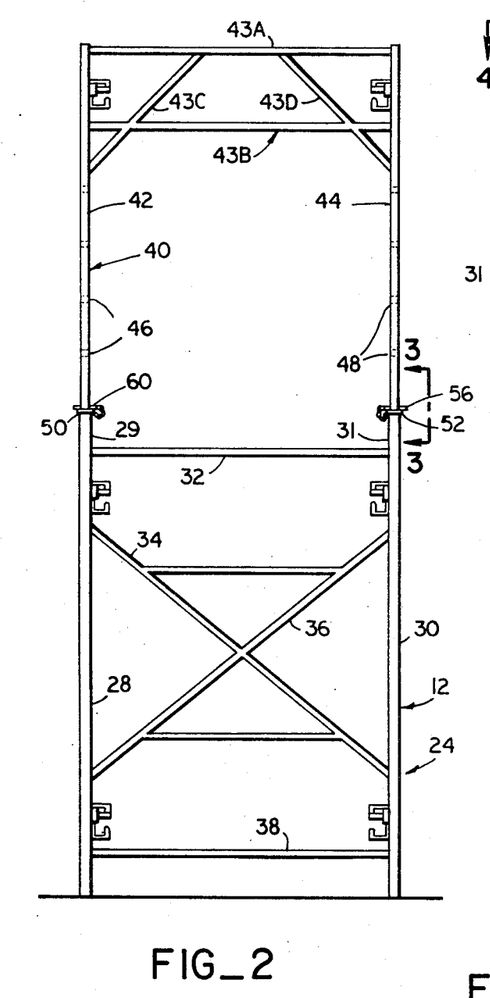
FIG. 2 is a front elevation of a shoring structure of FIG. 1 with a first embodiment of telescoping frame member.
Figure 3:
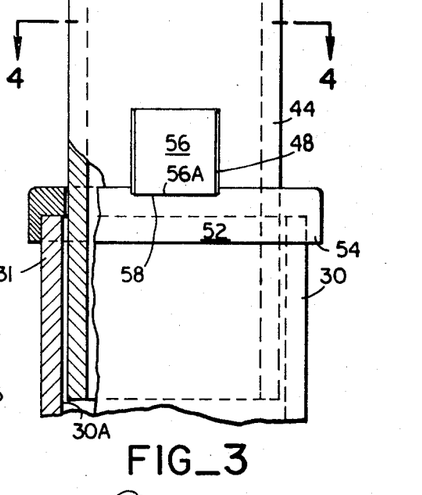
FIG. 3 is a view taken along the line 3—3 of FIG. 2, with a portion broken away.
Figure 4:
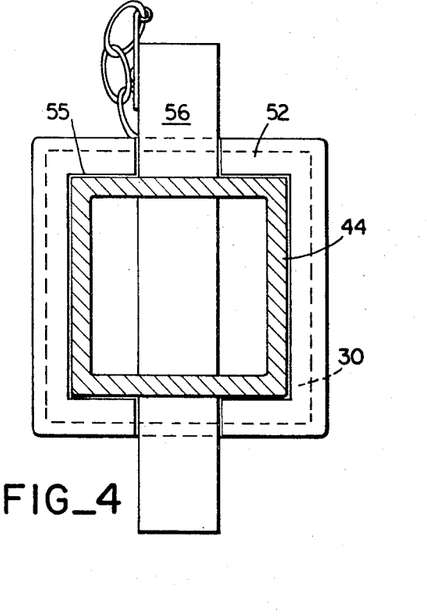
FIG. 4 is a sectional view taken along the line 4—4 of FIG. 3.

As shown therein, base 24 has a pair of generally parallel legs 28, 30 which are interconnected by cross members 32, 34, 36, 38, so as to be rigidly positioned relative to each other. Above the base 24 is a telescopic frame member 40, which also has a pair of generally parallel legs 42, 44 which are interconnected and reinforced by braces 43A, B, C and D. The legs 28, 30, 42, 44 are each square in cross section, as are braces 43A, B, C and D, and are actually tubular in configuration. The cross sections of legs 42, 44 are such that the legs 42, 44 are positionable within the inner bores of the tubular legs 28, 30. The positioning of leg 44 within inner bore 30A of leg 30 is shown in FIGS. 3 and 4, it being understood that legs 28, 42 cooperate in the same manner. A certain amount of clearance is provided between legs 42, 44 and the inner bores of legs 28, 30 respectively, so that the legs 42, 44 are slidable inside and along the legs 28, 30. Thus the telescoping frame member 40 is slidable inwardly and outwardly of the base 24.

Leg 42 has a plurality of spaced apertures 46 therethrough, and leg 44 has a corresponding plurality of spaced apertures 48 therethrough. Each of the apertures 46, 48 is square in cross-section. A pair of blocking members 50, 52 are positioned on the top ends 29, 31 of legs 28, 30 of base member 24. One such blocking member 52 is shown in detail in FIGS. 3 and 4. As shown therein, blocking member 52 has a downwardly extending edge 54 which surrounds the top end 31 of leg 30, and has an aperture 55 therethrough allowing free sliding of leg 44 therethrough. A pin 56 of square cross-section is positionable in any of the apertures 48 through leg 44, and, as leg 44 is lowered, a flat side 56A of pin 56 will bear against blocking member 52, sitting in a flat recess 58 provided therefor, so as to limit the inward sliding of leg 44 relative to leg 30.

A similar pin 60 of square cross-section is positionable in any of the apertures 46 through leg 42, and cooperates with blocking member 50 in a similar manner. In this way, the inward sliding of the telescopic frame member 40 relative to the base 24 may be limited with the telescopic frame member 40 at a desired height.

A second embodiment of telescopic frame member 70, associated with a base 24 as previously described, is shown in FIGS. 5–8. As shown therein, telescopic frame member 70 has a pair of generally parallel legs 72, 74 of square cross-section which are interconnected and reinforced by bracing 73A, B, C and D of square cross-sections. Leg 74 and its association with leg 30 of base 24 are shown in detail in FIGS. 6–8. As shown therein, leg 74 defines an inner bore 74A, and leg 30 of base 24 is positioned within that inner bore 74A, with a small clearance therebetween. In this way, leg 74 is slidable outside and along leg 30 of the base 24, with a longitudinal gap 76 being provided in leg 74 to allow clearance for the ends of cross members 32, 34, 36, 38 of base 24. It will be understood, of course, that leg 72 is associated with leg 28 in a similar manner.

Figures 5, 6, 7, 8:
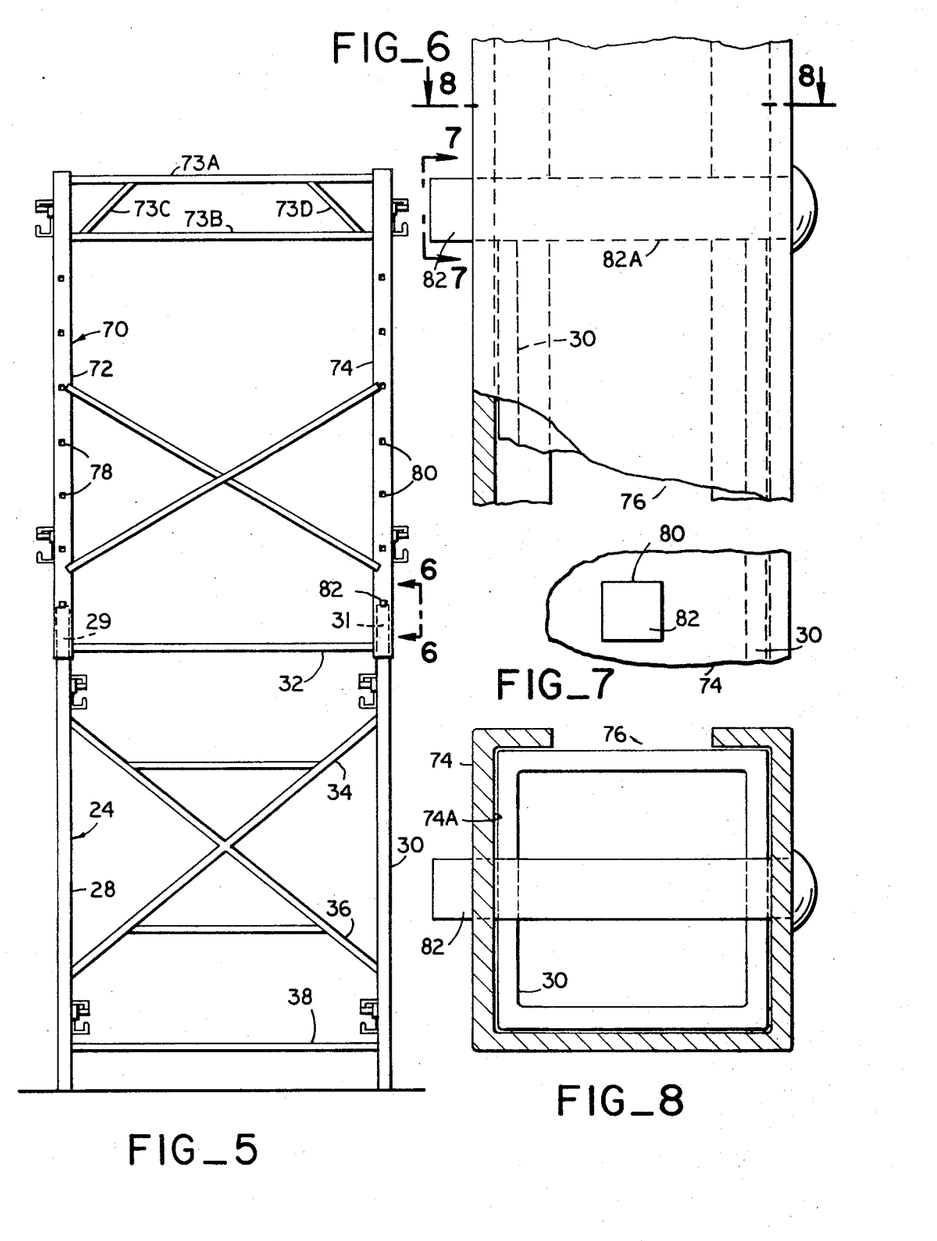
FIG. 5 is a view similar to that of FIG. 2, but with a second embodiment of telescoping frame member.
FIG. 6 is a view taken along the line 6—6 of FIG. 5, with a portion broken away.
FIG. 7 is a view taken along the line 7—7 of FIG. 6, with portions removed.
FIG. 8 is a sectional view taken along the line 8—8 of FIG. 6.
Figures 9, 12:
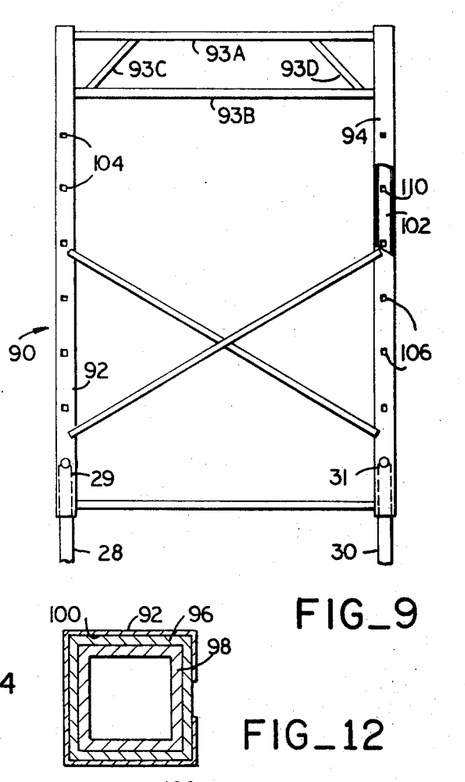
FIG. 9 is a view similar to that of FIGS. 2 and 5, but with a third embodiment of telescoping frame member, and with a portion of the base removed.
FIG. 12 is a sectional view taken along the line 12—12 of FIG. 10.
Figure 10:
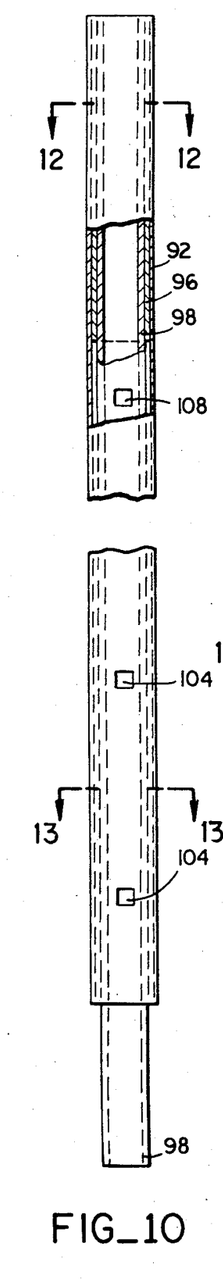
FIG. 10 is a front elevation of a leg of the telescoping frame member of FIG. 9 partially broken away, and with a portion removed.
Figure 11:
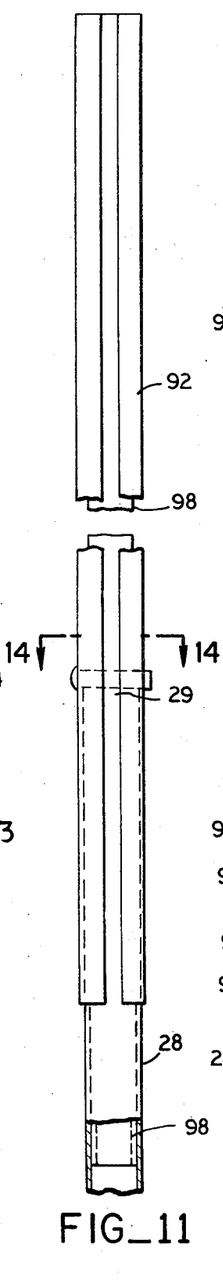
FIG. 11 is a side elevation of the leg of FIG. 10.
Figure 13:
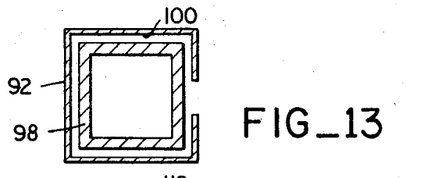
FIG. 13 is a sectional view taken along the line 13—13 of FIG. 10.
Figure 14:
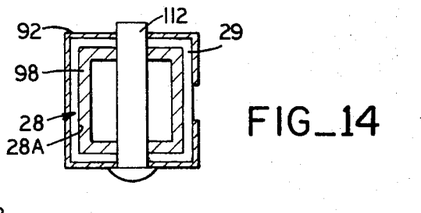
FIG. 14 is a sectional view taken along the line 14—14 of FIG. 11, rotated 90°.

Leg 74 has a plurality of spaced apertures 80 therethrough, and leg 72 has a plurality of spaced apertures 78 therethrough. Each of the apertures 78, 80 is square in cross section, as shown.

A pin 82 of square cross-section is positionable in any of the apertures 80, and a flat surface 82A thereof will bear on the flat top end 31 of leg 30, so as to limit the inward sliding of leg 74 relative to leg 30. A similar pin is positionable in any of the apertures 78, and cooperates with the top end 29 of leg 28 in a similar manner. In this way, the inward sliding of telescopic frame member 70 relative to base 24 may be limited, with the telescopic frame member 70 held at a desired height.

A variation of telescopic frame member 70 is shown in FIGS. 9–14. As shown therein, a telescopic frame member 90 has tubular legs 92, 94 of square cross section which are interconnected and reinforced by bracing 93A, B, C and D of square cross-section. Legs 92, 94 are slidable outside the legs 28, 30 of a base 24, similar to telescopic frame member 70. As shown in detail in FIGS. 10–14, leg 92 has a spacer 96, of square cross section welded therewithin adjacent the top end thereof, and a tubular guide 98, of square cross section, has its top end welded within the spacer 96. Guide 98 is thus spaced from the inner bore 100 of leg 92. Guide 98 extends downwardly below the bottom end of leg 92. In cooperation with the leg 28 of base 24, guide 98 is disposed within the inner bore 28A of leg 28, with the leg 28 itself within the inner bore 100 of leg 92. Leg 94 also includes a guide 102 associated therewith, which cooperates with leg 30 in a similar manner. Spaced apertures 104 of square cross-section are provided through leg 92, and spaced apertures 106 of square cross-section are provided through leg 94. Guides 98, 102 define spaced apertures 108, 110 of square cross-section which cooperate with apertures 104, 106, so that pins of square cross-section, such as pin 112, can be disposed therethrough, and will rest with flat surfaces thereof flush against the flat top ends 29, 31 of legs 28, 30 to limit the inward telescoping of telescopic frame member 90.

The shoring structures as disclosed may be set at a variety of heights, and may be used in a series in cooperation with jack means (not shown) if they are on uneven ground, as is well known.

The particular advantages of these designs should be noted. First, since each embodiment is fabricated of square tubing, it is extremely strong. Each embodiment is also quite easy to manufacture, when compared with shoring of round tubing. When using round tubing, each end of a cross-tube must be particularly cove cut to mate with the rounded surface of the tube to which it is to be joined, or each end must be smashed to flatten it out so that it can be welded. The former is obviously disadvantageous, as it is quite time-consuming, and the latter has been found to create cracks in the metal that can result in failure after welding, if the ends are smashed when cold. Heating the ends before smashing is expensive and time-consuming, and is generally not done.

In fabricating a shoring structure of tubing of square cross section, only one straight cut need be made on each end of a cross tube, so that it will mate with the flat surface of the tube of square cross-section to which it is to be joined. Also adding to the strength of the structure is the fact that no holes need be punched in the base of any embodiment.

In addition, the load-supporting pins are square in cross-section, and set in square apertures, with flat surfaces thereof engaging with flat bearing surfaces. Because of this design, the load on the telescopic frame member is distributed over a flat area, ensuring that the shear load capacity of the pin is very high. As a comparison, if the pin were round, the loaded area would be smaller, and in fact could well be a single point if the pin is disposed in a slightly oversize round aperture. In such case, many failures occurred because of the splitting of the tubing by this single point contact.

In any of the embodiments, it will be seen, telescoping of the frame member, and then setting it at its chosen height can be easily and conveniently achieved, merely by removing the pins, sliding the frame member, and reinserting the pins in the chosen apertures.

In particular, the blocking members 50, 52 of the first-described embodiment spread the load over the whole area of the top ends 29, 31 of the legs 28, 30, providing even greater load-bearing qualities.

The provision of guides tubes 98, 102 as shown in the third-described embodiment (FIGS. 10–14), provided a number of advantages. First, because of the double tube design of each leg, even greater strength is provided. Second, the load on each pin is spread over an even greater area, that is, that defined by apertures both in the leg and in the guide associated therewith. Third, the double tube structure, when cooperating with a leg of base 24, provides a rigidity between telescopic top frame member and base which does away with any need for connecting braces between the telescopic top frame member and base. Although the tubes of FIGS. 6–14 are shown as square in cross-section, the telescoping member may be adapted to a standard base having tubular legs of circular cross-section.

Figure 15:
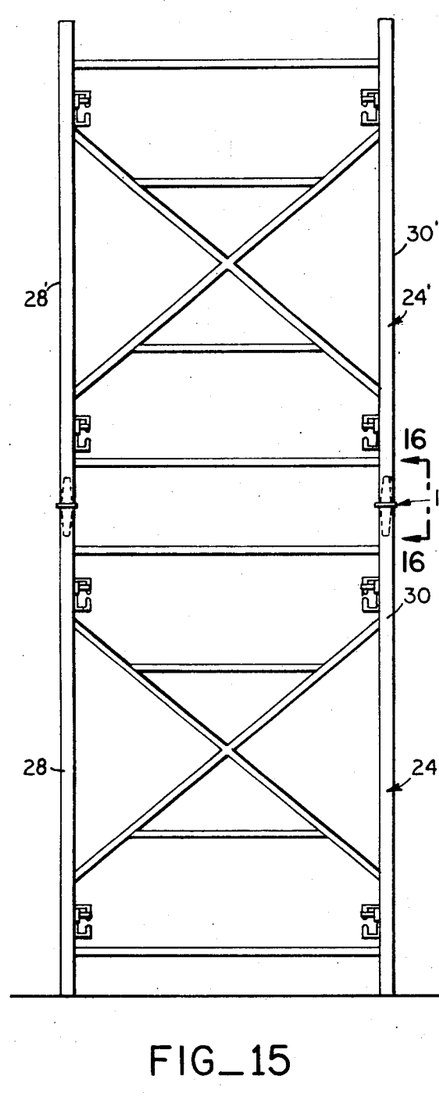
FIG. 15 is a front elevation of a pair of bases, one stacked on the other.
Figure 16:
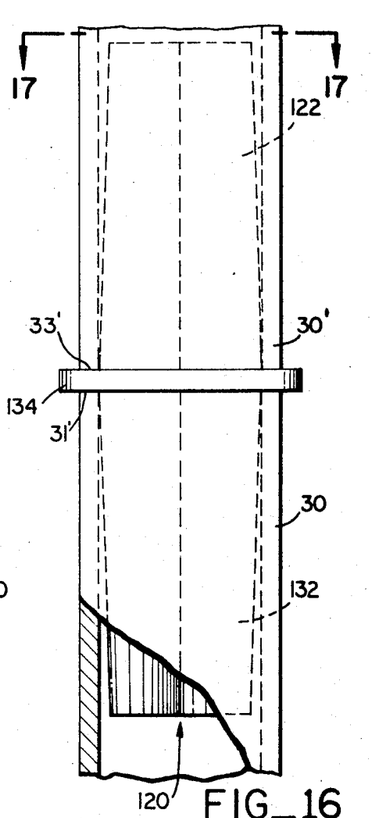
FIG. 16 is a view taken along the line 16—16 of FIG. 15, with portions broken away.
Figure 17:
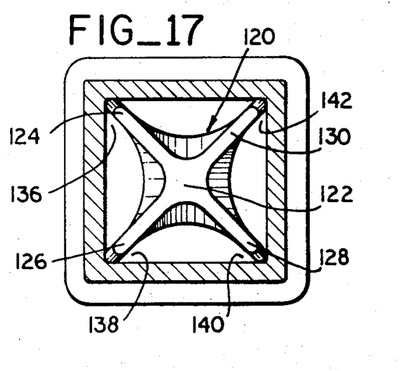
FIG. 17 is a sectional view taken along the line 17—17 of FIG. 16.

Shown in FIGS. 15–17 are means for stacking bases 24, 24' on top of each other to achieve greater overall shoring height. Such means are used in cooperation with upright tubes of square cross section, such as the legs 28, 28' and legs 30, 30' of bases 24, 24'. Such means comprise a rigid bar 120, as shown associated with tubular legs 30, 30', it being understood that a like bar is associated in a similar manner with tubular legs 28, 28'.

The rigid bar 120 defines an upper portion 122 which in turn defines four longitudinal ribs 124, 126, 128, 130, a lower portion 132 defining four similar ribs, and a circumferential lip 134 intermediate the upper and lower portions 122, 132. As shown, the ribs 124, 126, 128, 130 defined by the upper portion 122, and the corresponding ribs defined by the lower portion 132, taper inwardly away from the circumferential lip 134. In use, the lower portion 132 of the bar 120 is disposed in the upper end of the leg 30 and the upper portion 122 of the bar 120 is disposed in the lower end of the leg 30', with the circumferential lip 134 resting on the end 31 of leg 30, and on which rests the lower end 33' of leg 30'. In such use, the ribs 124, 126, 128, 130 are positioned in the inner corners 136, 138, 140, 142 defined by the lower end of the square-tube leg 30'. Similarly, the ribs defined by lower portion 132 are positioned in the inner corners defined by the upper end of square-tube leg 30. It will be seen that such design allows bases to be stacked on one another in series in a very strong, stable manner. This is so because of the ribs which are positioned in the inner corners defined by the legs. The taper of these ribs ensures that there can be no binding between the upper and lower portions of the rigid bar and the lower and upper ends of the legs.

As stated previously, FIG. 1 shows a pair of shorting structures 12, 14 interconnected by brace members 16, 18, 20, 22. Locks 200, fixed to the legs of the bases of shoring structures 12, 14, are used to secure the end portions of the longitudinal brace members 16, 18, 20, 22 to the legs of the bases. One of such locks 200, in cooperation with leg 30 of base 24, is shown in detail in FIGS. 18–21. Such lock 200 comprises a channel support member 202 fixed to leg 30 and defining an opening 204 therethrough. A shaft 206 is fixed to and extends from the support member 202. A slidable member 208 is disposed through the opening 204 defined by the support member and is slidable relative thereto.

The slidable member 208 has arms 210, 212 fixed to and extending outwardly and toward each other from the ends thereof.

The slidable member is slidable to a first position (shown in full in FIG. 19) where the ends 214, 216 of arms 210, 212 are removed from the shaft 206. When in such first position, the flattened end portion 22A of the longitudinal cross member 22 may be positioned so that the shaft 206 is disposed through an aperture 218 in the end portion 22A, and may be freely removed from such position. The slidable member 208 is also slidable to a second position (FIG. 18) where a portion 220 of the arm 210 adjacent the end 214 is positioned in a slot 222 in the shaft 206, so that the arm 210 extends from one side 224 of the shaft 206 to the other side 226, with the end 214 extending from the other side 226. In such second position, a nail or cotter pin 228 may be positioned through an opening 230 in the end 214 of the arm 210, to limit the movement of the end 214 of the arm 210 from its position on the other side 226 of the shaft 206. The slidable member 208 may thus be selectively held in its second position, whereby the end portion 22A of the longitudinal member 22 is locked on the shaft 206 by arm 210. Stop means 232 are included at one end of the slidable member 208 to contact the support member 202 to limit the sliding of the slidable member 208 in that direction, to define the second position of the slidable member.

The slidable member 208 is also slidable to a third position (shown in phantom in FIG. 19) where a portion 240 of the arm 212 is positioned in slot 222, so that the arm 212 extends from the other side 226 of the shaft 206 to the one side 224, with the end 216 extending from the one side 224. In such third position a nail or cotter pin, similar to cotter pin 228, may be positioned through an opening 242 in the end 218 of arm 212, to hold the arm 212 in such position, locking the end portion 22A of the brace member 22 on shaft 206. Similar to stop means 232, stop means 244 are included at the other end of the slidable member 208 to contact the support member 202 to limit the sliding of the slidable member 208 in that direction, to define the third position of the slidable member 208.

Figure 18:
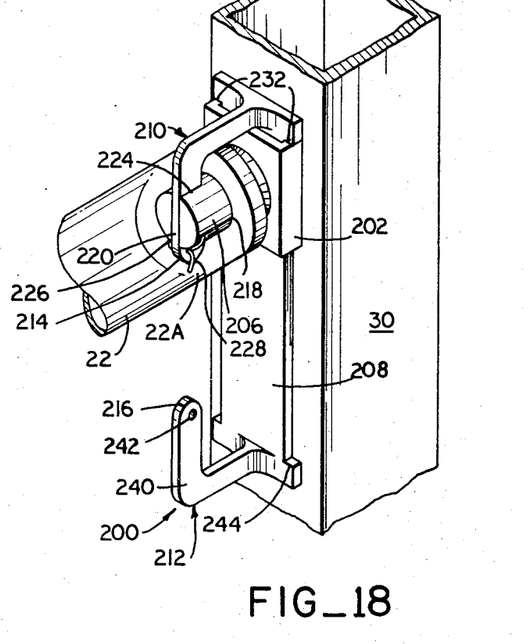
FIG. 18 is a perspective view of the lock as used in FIG. 1 to lock the cross brace members to a series of bases.
Figure 19:
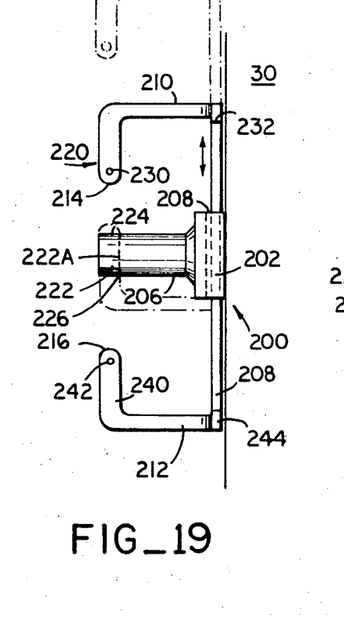
FIG. 19 is a side elevation of the lock of FIG. 18.
Figure 20:
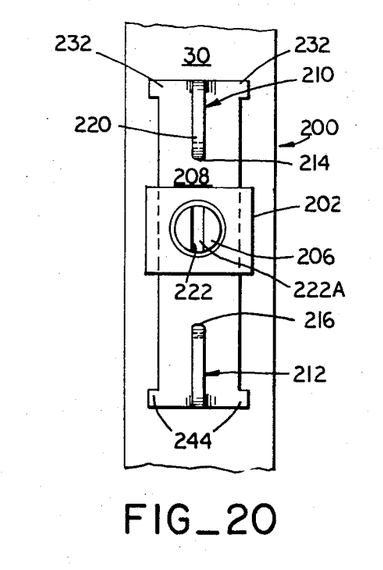
FIG. 20 is a front elevation of the lock of FIGS. 18 and 19.
Figure 21:
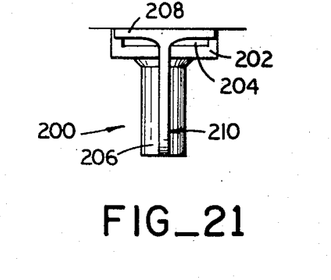
FIG. 21 is a plan view of the lock of FIGS. 18–20.

The base 222A of the slot 222 may be chamfered so that the arms 210, 212 are raised to an extent as they are seated in slot 222. This provides a certain amount of springing in the arms 210, 212, aiding in the locking action of the lock 200.

Such locks 200 as disclosed, where used throughout a shoring system such as that shown at 10 in FIG. 1, ensure a positive locking means for securing cross braces to the legs of the bases. The locks 200, it will also be seen, can be easily used to selectively lock or unlock such brace members, so that the overall shoring system may be built up, changed, or disassembled easily and conveniently.

I claim:

1. A lock for securing a portion of a longitudinal member relative to a frame portion comprising:
   a. a support member fixed to the frame portion;
   b. a shaft fixed to and extending from the support member, the portion of the longitudinal member being positionable so that the shaft is disposed through an aperture through said portion of the longitudinal member;
   c. a slidable member associated with the support member and slidable relative thereto;
   d. an arm fixed to and extending from the slidable member, the slidable member being slidable to a first position where the end of the arm is removed from the shaft to freely allow said portion of the longitudinal member to be positioned so that the shaft is disposed through the aperture, and to freely allow removal of said portion of the longitudinal member from such position, the slidable member being slidable to a second position where the end of the arm is adjacent the shaft, so that the movement of the portion of the longitudinal member from said position with the shaft disposed through the aperture is limited by the arm, a portion of the arm adjacent the end thereof being positioned in a slot in the shaft so that the arm extends from one side of the shaft to the other, with the end of the arm extending from said other side of the shaft, when the slidable member is in its second position, means selectively positionable through an opening in the end of the arm when it extends from said other side of the shaft, to limit the movement of the end of the arm from its position on said other side of the shaft, whereby the slidable member may be selectively held in its second position, and a second arm fixed to and extending from the slidable member, the first-mentioned and second arms being on opposite sides of the support member, the end of the second arm being removed from the shaft when the slidable member is in its first position to freely allow the portion of the longitudinal member to be positioned so that the shaft is disposed through the aperture, and to freely allow removal of said portion of the longitudinal member from such position, the slidable member being slidable to a third position where the end of the second arm is adjacent the shaft, so that the movement of the portion of the longitudinal member from said position with the shaft disposed through the aperture is limited by the second arm, a portion of the second arm adjacent the end being positioned in the slot in the shaft, so that the second arm extends from said other side of the shaft to said one side of the shaft, with that end of the arm extending from said one side of the shaft, when the slidable member is in its third position.

2. A lock according to claim 1 wherein are included means selectively positionable through an opening in the end of the second arm when it extends from said one side of the shaft, to limit the movement of the end of the second arm from its position on said one side of the shaft, whereby the slidable member may be selectively held in its third position.

3. A lock according to claim 1 wherein are further included first and second stop means associated with the slidable member to contact the support member to limit the movement of the slidable member and define the second and third positions thereof respectively.

* * * * *